April 26, 1960   V. W. GEWECKE   2,934,357
CORN PICKER MOUNTING MEANS
Original Filed June 17, 1957

INVENTOR.
V. W. Gewecke
BY Arthur H Sturges
Attorney

United States Patent Office 2,934,357
Patented Apr. 26, 1960

2,934,357

CORN PICKER MOUNTING MEANS

Vern W. Gewecke, Elm Creek, Nebr.

Substituted for abandoned application Serial No. 666,078, June 17, 1957. This application March 17, 1959, Serial No. 800,050

5 Claims. (Cl. 280—150)

This invention relates to farm implements and equipment particularly of the type used in corn harvesting, and in particular a hitch or connection for attaching a corn picker to a tractor of a different or foreign make whereby corn pickers of different types may be connected to tractors of different makes and particularly foreign tractors wherein the connecting elements of the corn picker and tractor do not register or coincide.

The purpose of this invention is to provide means for mounting a corn picker on a tractor wherein a conventional corn picker may be mounted on a tractor of substantially any type or design.

As mechanical farm equipment is comparatively costly many farmers share machines and consequently, such machines are used with tractors of different types and designs. Connecting elements that attach an implement, such as a corn picker, to one tractor will not necessarily connect the implement to another tractor, and for this reason various types of improvised mountings are resorted to and such mountings require skilled labor and take considerable time. As an illustration a farmer may be using an International Harvester type tractor with a Ford two-row-type corn picker and the connecting elements of the tractor and corn picker may be entirely different.

With this thought in mind this invention contemplates a mounting frame arranged to be secured by U-bolts to the rear axle housing of a tractor and having attaching elements thereon for securing a corn picker thereto.

The object of this invention is, therefore, to provide an assembly of structural shapes adapted to be secured to the rear axle housing of a tractor and having means for mounting a corn picker thereon.

Another object of the invention is to provide an intermediate frame for mounting a corn picker on a tractor in which the frame is arranged to be attached to tractors of different makes and in which corn pickers of different types may be secured to the frame.

Another important object of the invention is to provide a mounting for connecting a corn picker to a tractor wherein corn pickers of different sizes may be attached to the same mounting.

It is yet another object of the invention to provide a mounting for installing a corn picker on a tractor wherein the front section or snapping roll portion of the corn picker is supported by the mounting.

A further object of the invention is to provide a corn picker mounting wherein the mounting may be attached to a tractor and the corn picker secured on the mounting without adjusting parts of the mounting as connections are made thereto.

A still further object of the invention is to provide a mounting designed to be installed on the rear axle housing of a tractor with which different types of implements may be attached to the tractor without making changes or adjustments in the mounting.

And a still further object of the invention is to provide mounting means for attaching corn pickers and other implements to domestic and foreign tractors in which the mounting means is of a simple and economical construction.

With these and other objects and advantages in view the invention embodies inverted T-shape side plates having horizontal portions extended inwardly from upper ends with channel bars and connecting plates on the horizontal portions and with tubes extended inwardly from lower portions and connected to the channel bars and horizontal portions with vertically disposed channel bars, and wherein the channel bars on the horizontal portions are connected by an upper yoke and plates on the inner eds of the tubes are connected with a brace.

Other features and advantages of the invention will appear from the following description taken in connection with the drawings, wherein.

Figure 1:
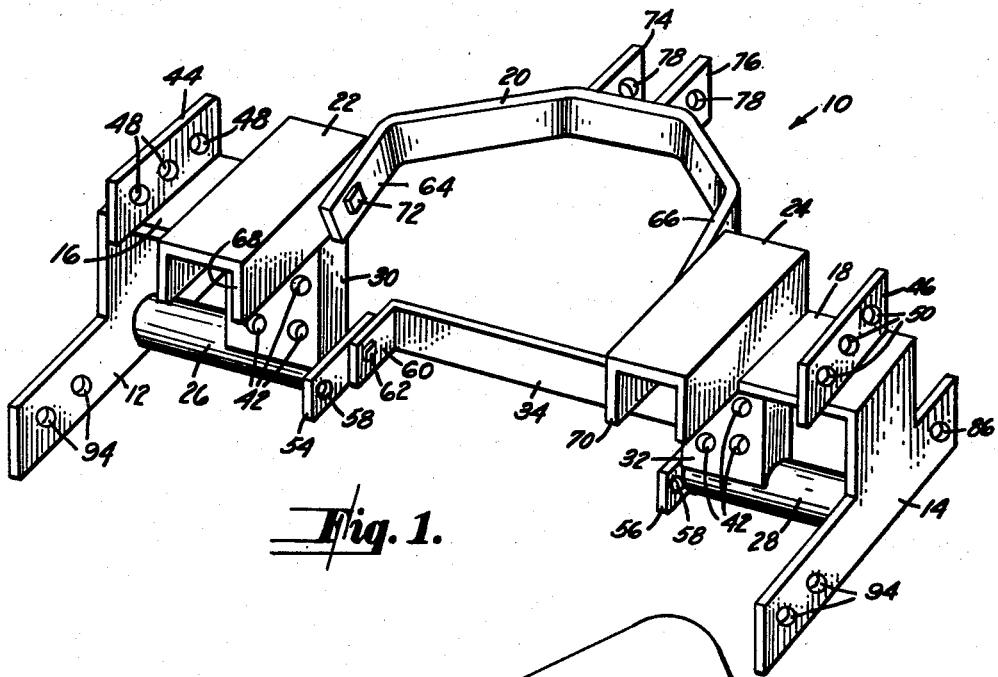
Figure 1 is a perspective view illustrating the improved corn picker mounting device.
Figure 2:
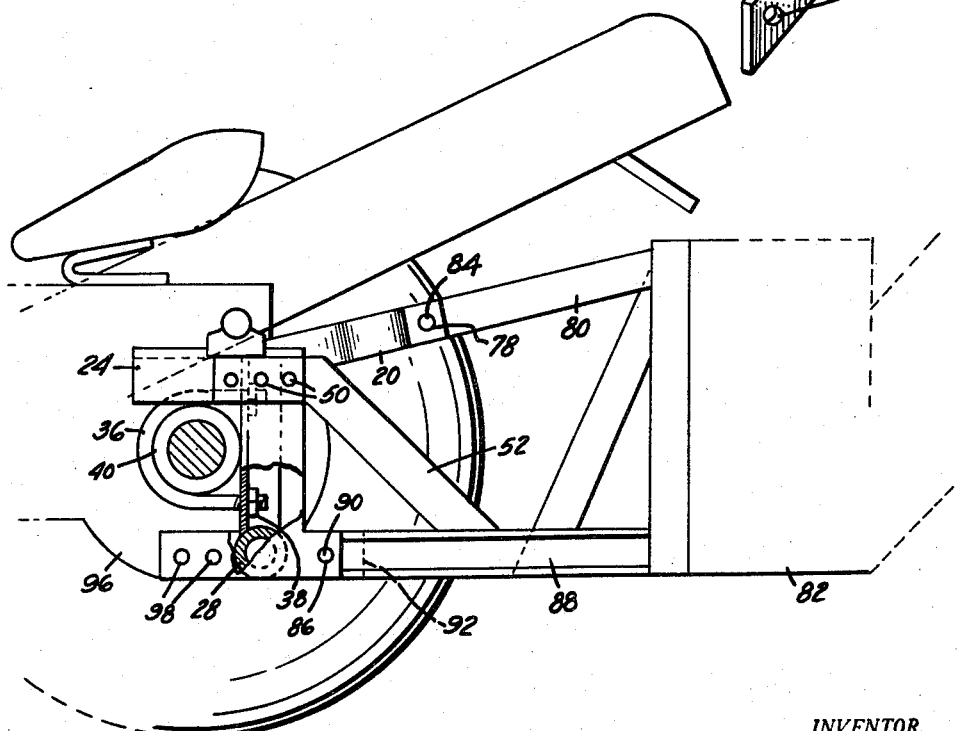
Figure 2 is a longitudinal section through the rear portion of a tractor showing a side elevational view of the mounting, with parts broken away and with the snapping roll portion of a corn picker shown in broken lines thereon.

This application is in substitution for the abandoned application Serial No. 666,078, filed June 17, 1957, now abandoned.

While one embodiment of the invention is illustrated in the above-referred-to drawings it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numerals 12 and 14 indicating inverted T-shape side plates having horizontally disposed portions 16 and 18 extended inwardly from upper ends thereof, numeral 20 a yoke connecting channel bars 22 and 24 on the portions 16 and 18, numerals 26 and 28 tubes extended inwardly from lower portions of the side plates, numerals 30 and 32 channel bars connecting inner ends of the tubes to the horizontally disposed portions 16 and 18, providing spacers, and numeral 34 a brace connecting lower portions of the frames.

The vertically disposed channel bars 30 and 32 are clamped by U-bolts 36 with nuts 38 on ends thereof, to the sections of the rear axle housing 40, with the channel bars 22 and 24 resting upon the housing. The channel bars 30 and 32 are provided with spaced openings or bolt holes 42 through which the U-bolts extend.

The channel bars 22 and 24 are secured to the horizontal portions 16 and 18 of the side plates 12 and 14, such as by welding, and the horizontal portions are also provided with tie, or connecting-plates 44 and 46 having bolt holes or openings 48 and 50 therein, and to which upper ends of braces 52 are connected by bolts or the like. The inner ends of the tubes 26 and 28 are provided with horizontally disposed plates 54 and 56 having openings 58 therein and flanges 60 on the ends of the brace 34 are secured to the plates 54 and 56 by bolts 62.

Ends 64 and 66 of the yoke 20 are secured to inner flanges 68 and 70 of the channel bars 22 and 24, respectively, with bolts 72, and the extended end of the yoke is provided with tangs 74 and 76, having openings 78 therein, and the tangs are secured to a tongue 80 of a corn picker 82 by a bolt 84.

The trailing ends of the side plates 12 and 14 are provided with openings 86 for attaching corn picker supporting members 88 to the side plates with bolts 90, however, the supporting members may be secured to the side plates by welding, as shown at the point 92. The forward ends of the side plates are also provided with openings 94 through which the side plates may be secured to the axle housing portion 96 with bolts 98.

By this means corn pickers of different types and sizes may readily be bolted or otherwise secured to the mounting device or hitch, and by the same means the mounting device may readily be secured to a tractor or the like.

With the frame or hitch assembled as illustrated and described the device may be stored when use thereof is not required, and when it is desired to connect an implement, such as a corn picker, to a tractor that is not provided with connecting elements to correspond with the implement, the device is mounted on the tractor by positioning the channel bars 22 and 24 on the rear axle housing and placing the U-bolts around the housing and through the holes 42 in the channel bars 30 and 32. With the bolts secured by the nuts 38 the device is rigidly attached to the rear axle of the tractor and the corn picker 82 may be secured to the tangs, tie plates, side plates and other parts thereof.

By this means corn pickers may be attached to tractors of different makes, and particularly of foreign makes, and the snapping roll portion of the corn picker is rigidly supported.

In the design shown the elements of the device are secured together by welding, however, it will be understood that the parts may be connected by other suitable means.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

1. A corn picker mounting means comprising spaced side plates having horizontally disposed inwardly extending portions on upper ends thereof, brace connecting plates with openings therein extended upwardly from the inwardly extended portions of the side plates, lower portions of the side plates having extended ends for connecting the mounting means to support bars of a corn picker, means connecting lower portions of the side plates across the mounting means, a mounting yoke connecting upper portions of the side plates and having spaced tangs for receiving a tongue of a corn picker extended therefrom, and attaching elements carried by the side plates and extended inwardly therefrom for connecting the mounting to the rear axle housing of a tractor.

2. A corn picker mounting means comprising spaced side plates having horizontally disposed inwardly extended portions on upper ends thereof, longitudinally positioned brace connecting plates positioned on the inwardly extended portions of the side plates and having openings for connecting braces of a corn picker thereto, horizontally disposed longitudinally positioned channel bars carried by the inwardly extended portions of the side plates and spaced inwardly from the brace connecting plates, vertically disposed channel bars depending from the inner ends of the inwardly extended portions of the side plates and having openings therein, U-bolts positioned in the openings of the vertically disposed channel bars for connecting the mounting means to the rear axle of a tractor, tubes carried by the side plates and extended inwardly from inner surfaces thereof, a brace connecting inner ends of the tube and a yoke having implement connecting tangs on the extended end connecting inner ends of the inwardly extended portions of the side plates.

3. A corn picker mounting hitch comprising spaced inverted T-shaped side plates having horizontally disposed portions extended inwardly from upper ends thereof, lower portions of the side plates being extended rearwardly to provide connections to supporting members of a corn picker, and forwardly to provide connections to the rear axle housing of a tractor, channel bars and connecting plates with openings therein positioned on the horizontally disposed portions of the side plates, a yoke mounted on said channel bars and having spaced tangs extended therefrom for connecting the hitch to the tongue of a corn picker, tubes having plates on inner ends thereof secured to and extended inwardly from the side plates, vertically disposed channel bars connecting the tubes to the horizontally disposed portions of the side plates, U-bolts positioned in the vertically disposed channel bars for connecting the hitch to the rear axle housing of a tractor, and a brace connecting the plates on the inner ends of the tubes.

4. In an implement mounting hitch, the combination which comprises spaced vertically positioned inverted T-shaped side plates, lower portions of the side plates being extended rearwardly for connecting the hitch to support members of a corn picker and extended forwardly for connecting the hitch to the rear axle housing of a tractor, upwardly disposed parts of the side plates having horizontally positioned portions extended inwardly therefrom, channel bars positioned on the horizontally positioned portions of the side plates, connecting plates with openings therethrough for connecting the hitch to braces of a corn picker also positioned on the horizontally positioned portions of the side plates, tubes having plates on inner ends thereof extended inwardly from lower parts of the side plates, vertically disposed channel bars having openings therein extended between the tubes and horizontally positioned portions of the side plates, said vertically disposed channel bars providing means for connecting the hitch to the rear axle housing of a tractor, means connecting inner ends of the tubes, and a yoke having spaced implement attaching tangs extended therefrom mounted on the channel bars on the horizontally positioned portions of the side plates.

5. In an implement mounting hitch, the combination which comprises spaced vertically disposed inverted T-shaped side plates having openings in extended ends thereof, the extended ends of the side plates providing means for connecting the hitch to support members of a corn picker and also to the rear axle housing of a tractor, said side plates having horizontally disposed portions extended inwardly from upper portions thereof, channel bars and connecting plates with openings therein positioned on the horizontally disposed portions of the side plates, the connecting plates being positioned to be connected to braces of a corn picker, a yoke having spaced implement tongue connecting tangs extended therefrom mounted on said channel bars, tubes having plates on inner ends thereof extended inwardly from lower portions of the side plates, vertically positioned channel bars connecting inner ends of the tubes and the horizontally disposed portions of the side plates, a brace bar having flanged ends connecting the plates on the inner ends of the tubes, and U-bolts carried by the vertically positioned channel bars for mounting the hitch and a corn picker mounted thereon on the rear axle housing of a tractor.

References Cited in the file of this patent

UNITED STATES PATENTS

| | | |
|---|---|---|
| 2,662,783 | Sawyer | Dec. 15, 1953 |
| 2,685,453 | Kuhary et al. | Aug. 3, 1954 |
| 2,704,496 | Taylor | Mar. 22, 1955 |